May 27, 1941.  W. MATZKA  2,243,761
STERILIZATION OF LIQUIDS
Original Filed Aug. 25, 1936    2 Sheets-Sheet 1
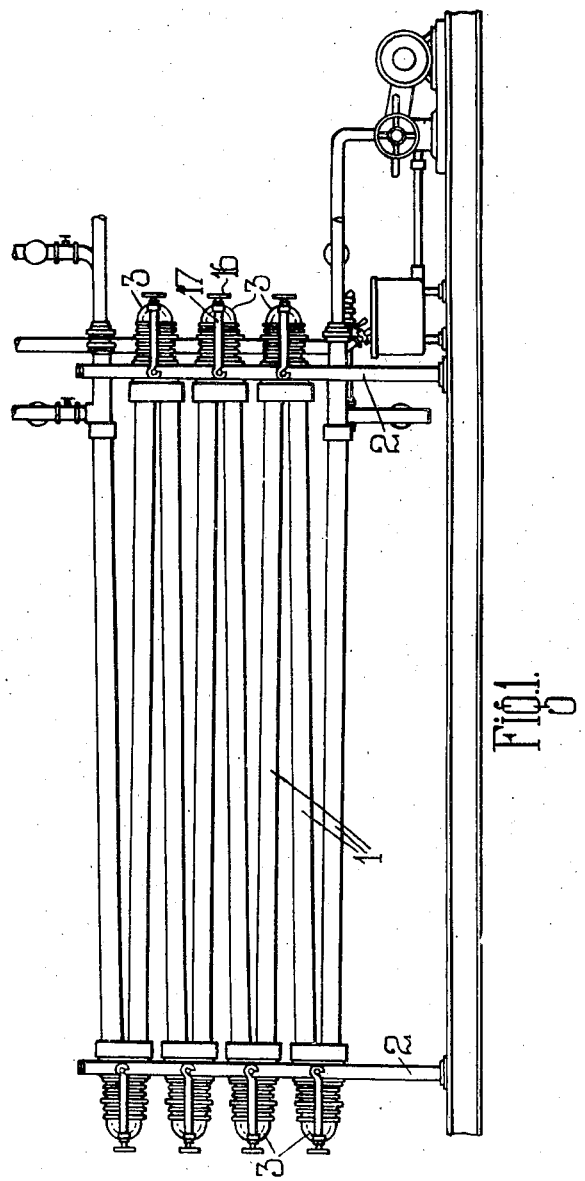
Inventor
Wincenty Matzka
by
Maxon & Porter
Attorneys

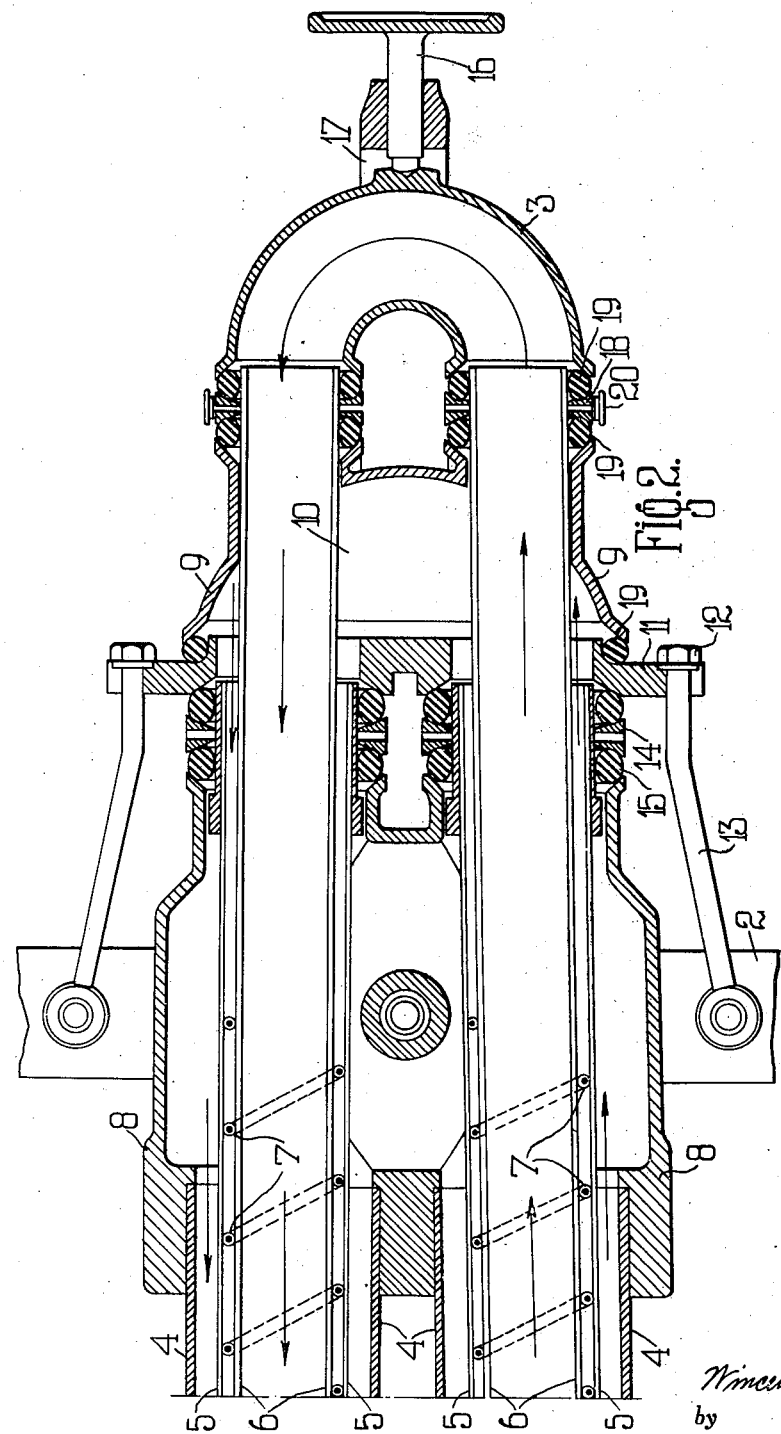

Patented May 27, 1941

2,243,761

UNITED STATES PATENT OFFICE 2,243,761

STERILIZATION OF LIQUIDS

Wincenty Matzka, Grasse, France

Original application August 25, 1936, Serial No. 97,853. Divided and this application March 20, 1939, Serial No. 262,968. In the Netherlands September 2, 1935

8 Claims. (Cl. 204—248)

This invention relates to improvements in the preservation of liquids and is a division of my application Serial Number 97,853 filed August 25, 1936, now Patent No. 2,209,345, issued July 30, 1940.

The usual preserving methods such as pasteurization, sterilization by heat or the addition of chemical substances, have a detrimental effect on the flavour of fruit juices or other liquids. Methods have been proposed for the sterilization of liquids with the object of avoiding any profound changes in the composition of the liquid. Thus it is known, for example, to sterilize water by means of silver ions liberated from metallic silver. This method is, however, only successful as a rule with clear filtered water. It is difficult or impossible to secure sterilization by this means of liquid containing colloidal bodies such as are frequently present in liquids of animal or vegetable origin.

According to the process of the present invention, liquid to be sterilize is caused to flow in substantial absence of air between the closely spaced surfaces of two or more different metals one at least of which splits off metal ions and which are independently heated to at least two different temperatures substantially below 100° C. (preferably not above 80° C.) and the liquid is caused to flow with thorough mixing, i. e. turbulently, in contact with the metals for several minutes, whereby it is subjected to thermal vibrations of high frequency. These thermal vibrations are brought about by the liquid undergoing repeated temperature changes and thorough mixing. It is not necessary to apply any electric current from an external source although this can be done if required. In any event the potential difference across the liquid is not allowed to exceed 1 to 1½ volts so as to avoid electrolytic decomposition. It is desirable to cause the liquid to flow with a circulatory movement and a translatory movement and to allow its speed of flow to be changed by occasional passage through large spaces. This facilitates adequate mixing. The liquid may be caused to flow in a helical path between the surfaces of the two different metals.

By the expression "different metals" is meant those metals which are of substantially different electrical potential i. e., spaced widely apart in the table of electro-chemical affinity. Thus there must be at least one metal which is of electro-negative character and another metal which is of electro-positive character. As the electro-positive metal nickel may be used or another electro-positive metal or an alloy which will not contaminate the liquid, such as aluminium or the like. As the electro-negative metal silver may be used or another electro-negative metal or alloy which will not contaminate the liquid such as one of the noble metals. Silver acts both as an electro-negative metal and as a metal splitting off metal ions and is therefore preferred; silver alloys, e. g. an alloy of silver and gold may be used.

To secure the best results the liquid should be passed a number of times between the surfaces of the different metals and thorough mixing of the liquid to be treated is produced by any suitable changing of its movement.

It is desirable to form the metal surfaces as conduits or confining walls for the liquid to be treated, e. g., they may constitute metal tubes arranged one within another, and separated from one another and of such dimensions that the liquid comes into contact with at least 20 metres length of surface per minute.

Liquids rich in pulp such as tomato or orange juice which generally contain entangled air should be treated for the removal of this by suitable known means before treatment.

Fat-containing emulsions should be thoroughly homogenized before treatment.

A preferred form of apparatus for carrying out the treatment of fruit juice or the like according to the present invention is illustrated in the accompanying drawings, in which—

Figure 1 is an elevation of the sterilizing apparatus, and

Figure 2 is a sectional elevation of the right-hand end of a pair of tubes on a larger scale showing the internal construction in greater detail.

In the arrangement shown in Figure 1 there are eight pipes 1 supported at their ends in frames 2 and connected together by elbows 3. Additional pipes may be added preferably in pairs if required.

As shown in Figure 2 each of the pipes 1 is formed with an outer jacket 4 constituted for example of steel, iron, brass or aluminium, an intermediate tube 5 formed of pure nickel, and an inner tube 6 formed of silver. The nickel tube 5 is heated by warm water passed through the space between the jacket 4 and the tube 5 and the pipe 6 is heated by warm water flowing through it to a temperature different from that of the pipe 5. In the annular space between the pipes 5 and 6 the liquid to be sterilized is caused to flow. The width of this annular space is about 3 to 5 mm. and within it is mounted an insulating spiral 7 which serves to separate the tubes 5 and 6 and which also constrains the liquid to flow in a helical path.

To cause the liquids to flow from one pipe to the next adjacent pipe, there is provided a jacket 8 which surrounds the ends of both pipes 4 and forms a communicating space by which liquid may pass from the space within the jacket 8 and the tube 5 terminates within a jacket 9 which also surrounds the ends of both tubes 5 and enables liquid passing from between the lower tubes 5 and 6 to enter the space between the upper tubes 5 and 6 or vice versa. The inner tube 6 extends to the elbow 3 so that this elbow serves to connect the interior spaces in the upper and lower tubes 6.

The jacket 9 is formed with a large space 10 which serves to facilitate a thorough mixing of any liquid passing therethrough.

For tightening the jacket 8 there are provided a collar 11, nuts 12, bolts 13 pivotally secured to the frame 2, movable washers 14 and rubber rubber rings 15.

For tightening the elbow 3 are provided a screw 16 working in a shackle 17 (see Figure 1) also pivotally connected to the frame 2, washers 18 and rubber rings 19. Some or all of the washers 14 and 18 may be provided with terminals 20 for connection to a source of electric current which is thereby fed to the tubes 5 and 6.

In use the temperature of the water passed through the space between the jacket 4 and tube 5 is 45 to 60° C., while the temperature of the water passed in the same direction through the interior of the tubes 6 is 10 to 20° higher.

The fruit juice or other liquid to be treated is fed into the annular space between the pipes 5 and 6 and is constrained to pass in a helical path through the presence of the spiral 7. This sets up rotation in the liquid which when it emerges from this space passes into the jacket 9 and into the large space 10 where it undergoes a thorough mixing before passing again into the annular space between the tubes 5 and 6 of the upper pipe. It is thus given three movements, a translatory movement through the annular space, a rotational movement and a slowing down or expansion in the large space 10.

The spiral 7 secures correct spacing of the tubes 5 and 6, guards against irregular deflection of these tubes, prevents electrical contact between them and ensures a circulatory movement of the liquid.

If desired the last pipe may be employed for cooling the liquid or to serve as a heat exchanger between the treated liquid and fresh liquid to be treated.

The liquid to be sterilized is caused to flow over approximately 20 metres length of pipe per minute. It has been found that the living micro-organisms and spores contained in the liquid under treatment are rendered inactive or killed after about 4 minutes treatment in the apparatus. The liquid so treated therefore may be bottled and sealed in a substantially sterile condition.

The process and apparatus of the present invention may be employed for the sterilization of potable liquids or semi-liquids of any kind such as fruit juices, beer, milk, liquid egg and the like and more especially those containing colloidal matter.

I declare that what I claim is:

1. Apparatus for the sterilization of liquid which comprises a pair of closely-spaced concentric tubes whose surfaces are at least of two different metals, at least one of which metals is such that it splits off bactericidal metal ions, means for feeding liquid through the space between said tubes, means for repeatedly changing the direction of flow of said liquid while in said space and comprising baffle means of non-conductive material located in said space and extending substantially from one metal surface to the other, and separate means for maintaining said tubes independently at different raised temperatures below about 80° C.

2. Apparatus for the sterilization of liquid which comprises a pair of concentric tubes of different metals at least one of which is such that it splits off bactericidal metal ions, means to feed liquid to be sterilized through the annular space between said tubes, a non-conductive helical baffle extending substantially from tube to tube in said annular space to change the direction of flow of said liquid and means for maintaining said tubes at different raised temperatures below about 80° C.

3. Apparatus for the sterilization of liquid which comprises a pair of closely spaced concentric tubes one of nickel and the other of silver, means for delivering liquid to be sterilized to one end of the annular space, non-conductive baffle means extending from one tube to the other tube in said annular space to impart rotational movement to said liquid, an outlet for said liquid at the other end of said annular space and means for maintaining said tubes at different superatmospheric temperatures below about 80° C.

4. Apparatus for the sterilization of liquid which comprises a pair of closely spaced concentric tubes of different metals at least one of which is such that it splits off bactericidal metal ions, means for feeding liquid through the annular space between said tubes, non-conductive means in said annular space for imparting turbulent motion to said liquid while flowing in said annular space, means to pass heated liquid through the inside one of said pair of tubes to maintain it at a predetermined superatmospheric temperature, a jacket surrounding the outer one of the pair of tubes and means to pass heated liquid through said jacket to maintain said outer tube at another predetermined superatmospheric temperature.

5. Apparatus for the sterilization of liquids, comprising members presenting closely spaced surfaces of two different metals, one of said metals being a metal capable of splitting off bactericidal metal ions and the other metal being electropositive to the said first metal, means for feeding the liquid through the space between said surfaces, means for maintaining said metal surfaces at different raised temperatures each below 80 degrees C., and means for causing the liquid flowing between said surfaces to make repeated changes of direction of movement in said space whereby to produce a turbulent flow and thorough mixing of the liquid while moving between said differently-heated surfaces, said latter means including a baffle structure of non-conductive material located in said space and extending substantially from one metal surface to the other.

6. Apparatus for the sterilization of liquids, comprising two concentric tubes providing an annular space for the passage of the liquid, means for feeding the liquid through said annular space, the tubes presenting to said annular space for contact with the liquid closely spaced surfaces of two different metals, one of said metals being a metal capable of splitting off bactericidal metal ions and the other metal being electropositive to the said first metal, means for maintaining said metal surfaces at different raised temperatures each below 100 degrees C., and a non-conductive helical baffle means within said space for causing the liquid to flow in a helical path and thereby effecting a turbulent flow and thorough mixing of the liquid while moving between the closely-spaced and differently-heated surfaces.

7. Apparatus for the sterilization of liquids, comprising two concentric tubes providing an annular space for the passage of the liquid, means for feeding the liquid through said space, the tubes presenting to said space for contact with the liquid closely spaced surfaces of two different metals, one of said metals being a metal capable of splitting off bactericidal metal ions and the other metal being electropositive to the said first metal, means for maintaining said metal surfaces at different raised temperatures each below 100 degrees C., and a non-conductive helical baffle member positioned within said space and extending from one tube to the other for causing the liquid to flow in a helical path and thereby effecting a turbulent flow and thorough mixing of the liquid while moving between the differently-heated surfaces.

8. Apparatus for the sterilization of liquids, comprising members presenting closely spaced surfaces of two different metals, one of said metals being silver and the other metal being electropositive to silver, means for feeding the liquid through the space between said surfaces, means for maintaining said metal surfaces at different raised temperatures each below 100 degrees C., and non-conductive helical baffle means in said space for causing the liquid flowing between said surfaces to make repeated changes of direction of movement whereby to produce a turbulent flow and thorough mixing of the liquid while moving between said differently-heated surfaces.

WINCENTY MATZKA.